Figure 1:
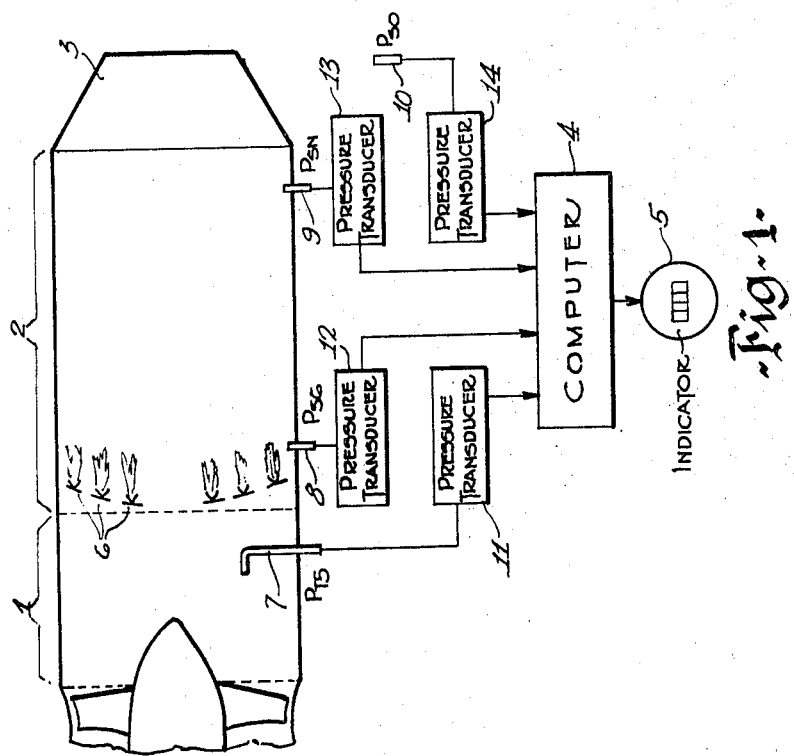

United States Patent [19]

McDonald et al.

[11] 3,837,220
[45] Sept. 24, 1974

[54] DETERMINATION OF GROSS THRUST-RELATED PARAMETERS

[75] Inventors: George B. McDonald; George B. Mackintosh, both of Bells Corners, Ontario, Canada

[73] Assignee: Control Data Canada, Ltd., Willowdale, Ontario, Canada

[22] Filed: Oct. 27, 1972

[21] Appl. No.: 301,335

[30] Foreign Application Priority Data
Aug. 31, 1972 Canada .............................. 150685

[52] U.S. Cl. ............................................. 73/117.4
[51] Int. Cl. ........................................ G01m 15/00
[58] Field of Search ................ 73/117.4, 116, 117.3

[56] References Cited
UNITED STATES PATENTS
3,233,451  2/1966  Russ.................................. 73/117.4

Primary Examiner—Jerry W. Myracle
Attorney, Agent, or Firm—Harvey I. Marshall

[57] ABSTRACT

It is known to obtain a correction factor by determining theoretical gross thrust by measuring engine pressures and by measuring actual gross thrust and using a comparison between theoretical and measured gross thrust to develop a correction factor. However the correction factor is variable in accordance with certain engine pressures and requires the use of elaborate altitude test cell facilities to define it for a practical working range. This invention measures engine pressures in a static sea level facility, derives a correction factor to be applied to one of the measured pressures for use in a determination of gross thrust useful under all operating conditions.

12 Claims, 2 Drawing Figures

DETERMINATION OF GROSS THRUST-RELATED PARAMETERS

The invention herein described was developed using funds of the United States and Canadian goverments.

This invention relates to thrustmeters and to measurement methods and apparatus used in the determination of the aerodynamic gross (jet) thrust of a jet engine. In particular this invention relates to the determination of parameters useful in the determination of gross thrust and apparatus making use of the parameters for the determination of gross thrust.

As is well known, it is very desirable to be able to determine the gross thrust of a jet engine because an accurate determination of gross thrust can be used in several phases of aircraft operation. For example, an accurate knowledge of jet engine gross thrust for an afterburning and non-afterburning jet engine is useful information at take-off since this will enable the payload at take-off to be maximized. Also gross thrust can be monitored during the initial climb to ensure the optimum schedule is adhered to because this results in prolonging engine life. It can also be used for engine condition control as well as to ensure efficient use of the powerplant during the cruise segment of the aircraft operation.

In the past a number of systems have been used to provide an indication or determination of gross thrust. The prior art systems have not been completely satisfactory because they have been too complex or because they did not provide sufficient accuracy, or for other reasons. Some further background may clarify the problems involved.

The aerodynamic gross thrust of a jet engine is conventionally defined as the momentum of the nozzle exhaust gases plus any pressure force which exists due to incomplete expansion of the exhaust gases. This definition, written in equation form, is:

$$F_G = \dot{m} V_e / g_o + A_e (P_{se} - P_{so}) \tag{1}$$

wherein:
$F_G$ = gross thrust
$\dot{m}$ = mass flow rate through the exhaust nozzle
$V_e$ = velocity of exhaust gases
$g_o$ = dimensional constant
$A_e$ = exit area of nozzle
$P_{se}$ = static pressure at the nozzle exit
and
$P_{so}$ = ambient static pressure.

In the previous teachings the gross thrust, given by equation (1), has been alternately expressed in terms of obtainable aerodynamic and geometric parameters, for example, static pressure(s), total pressure(s), total temperature and jet engine nozzle geometry defined by its various diameter(s). The prior art is primarily concerned with measurement techniques which employ a certain nozzle area, ambient static pressure, and various internal pressures in order to ascertain gross thrust.

For example, an early prior art system for determining gross thrust used as the only variables the measurement of pressures inside and outside the engine, but it required a knowledge of nozzle area. Perhaps the most difficult measurement to obtain in flight is a measurement of nozzle area $A_e$.

In the state of the art about the time of the above system there were two types of exhaust nozzle normally fitted to jet engines. These were the convergent nozzle and the convergent-divergent nozzle. The convergent nozzle is normally used on engines in aircraft which are required to have supersonic dash capability. Thrust augmentation on air superiority aircraft for example is obtained by burning fuel in the jet engine tailpipe upstream of the exhaust nozzle. The convergent-divergent nozzle is often used on supersonic cruise aircraft where the prime requirement is maximizing the aircraft range or endurance. The convergent-divergent nozzle is ideally capable of expanding the exhaust gases to ambient pressure regardless of throttle setting and flight condition. The convergent nozzle can only accomplish this complete expansion when the ratio of nozzle total pressure to ambient static pressure is less than a certain value dependent upon the ratio of specific heats of the exhaust gas. Thus, with a convergent only type nozzle the realistic situation is one in which the exhaust gases are not completely expanded.

The early prior art deals with two situations in determining gross thrust using measurement of pressures as the only variables. In one system there is a fixed nozzle area. In the other the nozzle is of the modulating or variable type and the area must be known at all times. This latter system for determining gross thrust is based on the following equations:

(Complete expansion)

$$F_G = P_{so} \cdot g_c(\alpha_e) \cdot f(A_e) \tag{2}$$

(Incomplete expansion)

$$F_G = P_{so} \cdot g_I(\alpha_e) \cdot f(A_e) \tag{3}$$

where
$E_{SN}$ = gross thrust
$P_{so}$ = ambient static pressure
$f(A_e)$ = function of the nozzle exit area $A_e$
$g_c(\alpha_e)$ = function of the pressure ratio $P_{TN}/P_{so}$ for complete expansion
$g_I(\alpha_e)$ = function of the pressure ratio $P_{TN}/P_{so}$ for incomplete expansion
and
$P_{TN}$ = nozzle total pressure.

It will be seen that $f(A_e)$ is required in both equations. As was previously mentioned, the signal representing a function of nozzle area is a most difficult one to obtain. It is known to employ a signal from the actuator which controls the nozzle area. The signal has been found to lack the required accuracy as operating conditions vary. Prior art nozzles and ejectors are manufactured using overlapping metal leaves to form the variable nozzle. The leaves are flexible and their deflection depends to some extent on aircraft flight mach number, altitude and engine throttle setting. While attempts have been made to adjust the signal which represents the function, the results have not always been satisfactory.

A subsequent prior art system for determining gross thrust eliminated the difficult determination of nozzle exhaust area by using instead a measurement of static pressure at the nozzle entrance. In this system the gross thrust is determined using the following equations.

(complete expansion) $F_G = A_N \cdot P_{so} \cdot \alpha_e \cdot f_c(\alpha_e) \cdot h(\alpha_N)$ (4)

(incomplete expansion) $F_G = A_N \cdot P_{so} \cdot \alpha_e \cdot f_I(\alpha_e) \cdot h(\alpha_N)$ (5)

wherein:
  $F_G$ = gross thrust
  $P_{so}$ = ambient static pressure
  $A_N$ = area of nozzle entrance, fixed
  $f_c(\alpha_e)$ = function of the pressure ratio $P_{TN}/P_{so}$ for complete expansion
  $f_I(\alpha_e)$ = function of the pressure ratio $P_{TN}/P_{so}$ for incomplete expansion
and
  $h(\alpha_N)$ = function of the pressure ratio $P_{TN}/P_{SN}$ which is independent of the nozzle type.

It will be noted from the above equations that the gross thrust can be calculated from a knowledge of three variables, namely the nozzle total pressure $P_{TN}$, nozzle entry static pressure $P_{SN}$ and the ambient static pressure $P_{so}$. In this approach the nozzle entrance area $A_N$ is a constant.

The above prior art system requires the use of immersed total and static pressure probes at the nozzle entrance. Immersed probes can sometimes be in a hostile environment. In the erosive atmosphere in the engine nozzle when the afterburner is operating, the life of a probe may be very short. Such immersed probes are normally continuously or intermittently cooled to maintain their mechanical integrity. In addition, the location of the probes to provide an average total pressure and static pressure will be satisfactory at substantially only one power setting of the engine.

A Canadian patent application Ser. No. 126,454 was filed on Oct. 29, 1971 for a "Method and Apparatus for Determining the Thrust of a Jet Engine," and assigned to the same assignee as the present invention, relating to a mechanization of equations (4) and (5) in such a manner as to avoid the need of immersed total and static pressure probes. A counterpart application Ser. No. 222,225 was filed in the U.S. on Jan. 31, 1972. In one embodiment the technique uses a novel, thermodynamically exact equation relating $P_{TN}$ and $P_{T5}$ using two independent engine static pressures, predetermined functions of the pressures or differences thereof, known constants and predetermined functions of these constants:

$$P_{TN} = P_{SN} \cdot \left\{ 1 + \frac{\frac{f_1(P_{S6}, P_{SN})}{f_2(P_{S6}, P_{SN})} + f_6(\alpha_5) \cdot \left[ f_3(K_2) + \frac{f_5(P_{S6}, P_{SN})}{f_2(P_{S6}, P_{SN})} \right] \cdot [f_7(\alpha_5) - K_1]}{f_4(K_2) - \frac{f_5(P_{S6}, P_{SN})}{f_2(P_{S6}, P_{SN})}} \right\} K_3$$

wherein:
  $K_1$ = dimensionless constant
  $K_2$ = dimensionless constant derived from the tailpipe geometry
  $K_3$ = dimensionless constant derived from the known thermodynamic properties of the engine exhaust gas
  $P_{SN}$ = nozzle entry static pressure
  $P_{S6}$ = static pressure near the flameholder
  $\alpha_5 = P_{T5}/P_{S6}$ = total pressure upstream of the flameholder/static pressure near the flameholder
  $f_6(\alpha_5), f_7(\alpha_5)$ = functions of the pressure ratio $P_{T5}/P_{S6}$ $f_1(P_{S6}, P_{SN}), f_2(P_{S6}, P_{SN}), f_5(P_{S6}, P_{SN})$ = functions of the tailpipe static pressures $P_{S6}, P_{SN}$
and
  $f_3(K_2), f_4(K_2)$ = functions of the dimensionless constant $K_2$.

The constant $K_1$ is determined from performance data obtained from a non-afterburning static sea level test of the engine. When the engine operates in the afterburning mode the above equation, unmodified, can be employed to calculate the desired nozzle total pressure $P_{TN}$. Thus, the equation is useful in determining $P_{TN}$ in both afterburning and non-afterburning modes. This feature of the invention enables a continuous indication of jet engine thrust to be calculated and does not require an a priori knowledge of when the engine is operating in the afterburning mode and when it is not.

In another embodiment of the technique it is possible to eliminate one independent static pressure measurement from the present gross thrustmeter system if the engine is tested, for calibration purposes, in both the dry (non-afterburning) and afterburning modes of operation. The present invention is therefore also concerned with the mechanization of the following simple technique which enables a calculation of the nozzle total pressure using two independent internal engine pressures and a few constants.

The relationship between $P_{T5} - P_{TN}/P_{T5}$ and $P_{SN}/P_{T5}$ is essentially a straight line for both the afterburning and nonafterburning modes of engine operation. This fact is displayed by the following simple equations:

a. afterburner on: $P_{TN} = P_{T5} \cdot (1 - a_1(P_{SN}/P_{T5}) - b_1)$ (8)

b. afterburner off: $P_{TN} = P_{T5} \cdot (1 - a_2(P_{SN}/P_{T5}) - b_2)$ (9)

wherein:
  $P_{T5}$ = total pressure measured upstream of the flameholder
  $P_{TN}$ = nozzle total pressure
  $P_{SN}$ = static pressure measured downstream of the flameholder
  $a_1$ = slope of the straight line representing an afterburning characteristic
  $a_2$ = slope of the straight line representing a nonafterburning characteristic
  $b_1$ = intercept of the afterburning curve on the axis used to represent $P_{T5} - P_{TN}/P_{T5}$
and
  $b_2$ = intercept of the non-afterburning curve on the axis used to represent $P_{T5} - P_{TN}/P_{T5}$.

The nozzle total pressure $P_{TN}$ may therefore be calculated using the internal engine pressures $P_{T5}$ and $P_{SN}$ in one of the equations listed above. The equation selected is determined by the value of the ratio $P_{SN}/P_{T5}$. However both the embodiments of the aforementioned Canadian application require that static pressure be measured on the tailpipe liner at the nozzle entrance. This static pressure can be subject to error for the following reasons:

1. The modulating nozzle can affect the streamline curvature hence radial static pressure gradient in close proximity to the static pressure tap which is located on the liner near the nozzle entrance. This will occur for a given tailpipe mass flow, radial total pressure gradient and radial total temperature gradient at the measuring station.
2. Depending on the streamline distribution near the static tap, a certain quantity of cooling air which enters the tailpipe from the annulus formed by the tailpipe casing and liner can significantly influence the static pressure which is sensed by the liner tap.

These two factors really arise because the flow in the exhaust region of a jet engine is far from uniform. All the techniques in the prior art which employ measurement of internal engine pressure to determine gross thrust, necessarily assume a one-dimensional flow because of the tremendous mathematical difficulty in assuming otherwise. The engine manufacturing industry normally rely to a considerable extent on what is known as a "gross thrust coefficient $C_{fg}$." This coefficient is defined as the ratio of the actual engine gross thrust to the ideal one-dimensional gross thrust as would be computed using any of the prior art systems and any of equations (1) to (5). Obviously a calibration is required to ascertain $C_{fg}$ and its variation with some measurable parameter. It has been found to correlate well with the exhaust nozzle pressure ratio $P_{TN}/P_{so}$. Nevertheless the calibration still requires the use of elaborate altitude test cells to generate realistic flight conditions. It is important to note that only a very small portion of the calibration curve for $C_{fg}$ versus $P_{TN}/P_{so}$ can be presently generated in a simple static sea level operation of the engine over its entire range of throttle settings.

It is an object of the present invention to provide means for determining gross thrust which does not require the calibration of the jet engine in an altitude test cell.

It is another object of the invention to provide improved apparatus for determining gross thrust of an engine in both the afterburning and non-afterburning modes of operation using a calibration made at sea level in the non-afterburning mode of engine operation.

Briefly the invention comprises a method and apparatus for use in a jet type engine including a diffuser and a nozzle for determining a corrected static or total pressure at the entrance to the nozzle, comprising pressure responsive means for measuring engine pressures including $P_{SN}$ static pressure at the nozzle entrance and $P_{TN}$ total pressure at the nozzle entrance, and providing first and second signals representing the engine pressures, and computer means for combining the first and second signals to provide a corrected total or static pressure. The corrected total or static pressure can be used to develop a correction factor for application to the pressure measured in flight for accurate determination of gross thrust.

In another form the invention comprises a method and apparatus for use in a jet type engine including a diffuser and a nozzle for determining corrected static pressure at the entrance to the nozzle, comprising pressure responsive means for measuring engine pressures including $P_{SN}$ static pressure at the nozzle entrance $P_6$ static pressure in the flameholder region, and $P_{T5}$ total pressure in the diffuser, and providing first, second and third signals representing the engine pressures, means for combining the first, second and third signals to develop a corrected nozzle entry static pressure. The corrected static pressure can be used to develop a correction factor for application to the pressure measured in flight for accurate determination of gross thrust.

Figure 2:
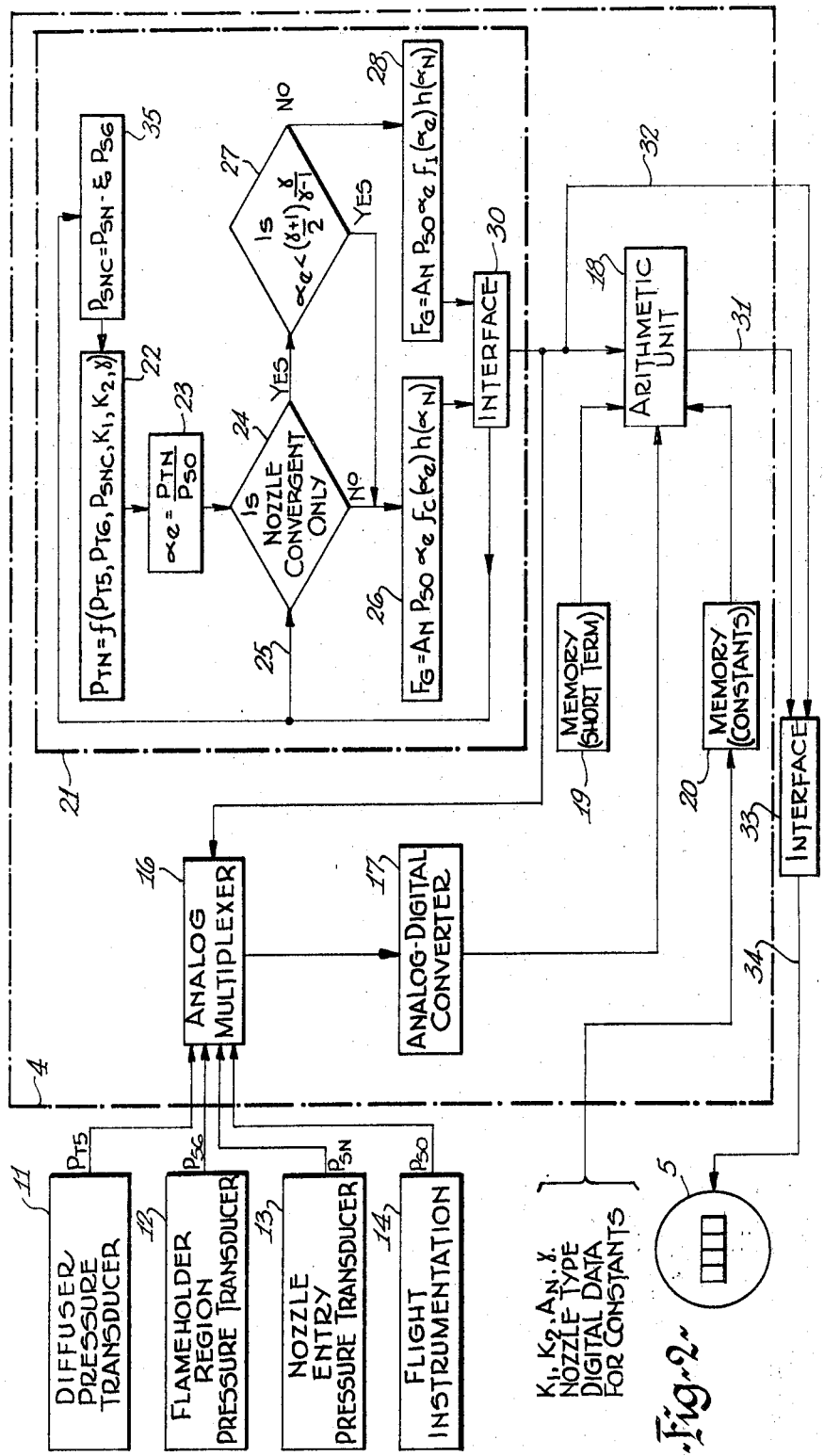

The invention will be described hereinafter in greater detail with reference to the accompanying drawings, in which FIG. 1 is a schematic diagram showing the components in a thrustmeter for a jet engine, and FIG. 2 is a block diagram showing the gross thrust system of the invention.

Referring to FIG. 1 of the drawing, there is shown in schematic form, an afterburning jet engine with a diffuser 1, tailpipe (afterburner) 2 and nozzle 3. A computer 4 receives signals from four pressure transducers 11, 12, 13 and 14 responsive, respectively, to total pressure ($P_{T5}$) from diffuser section at probe 7, static pressure ($P_{S6}$) from the flameholder area at tap 8, nozzle entry static pressure ($P_{SN}$) at tap 9, and altitude ambient static pressure ($P_{SO}$) which is indicated as available at detector 10. It should be noted that the pressure responsive device at 8 for detecting $P_{S6}$ can be located at any convenient place between the upstream side of the diffuser and the nozzle entrance region where the device for detecting $P_{SN}$ is located at 9. In an engine with an afterburner, as shown, it is conveniently located in the afterburner region or flameholder region. In an engine without an afterburner it could be located in the diffuser. It should also be noted that for airborne installations a signal which is indicative of the altitude ambient static pressure is already available from the aircraft's flight instrumentation or control system. The computer 4 produces a resultant signal which is indicative of gross thrust. This signal is fed to an indicating instrument 5 which displays the gross thrust $F_G$.

In the thrustmeter according to this invention it is not necessary to use an immersed total pressure probe in the nozzle region. The thrustmeter is similar in this respect to that disclosed in aforementioned Canadian patent application Ser. No. 126,454. However, in the prior art, including the aforementioned application Ser. No. 126,454, it was necessary to provide a gross thrust coefficient $C_{fg}$ to account for some of the difference resulting from the actual gas flow being different from a one-dimensional model. The calculation of $C_{fg}$ is elaborate and requires an altitude test cell to produce the desired nozzle pressure ratios. These nozzle pressure ratios are required to complete the calibration curve of $C_{fg}$ versus nozzle pressure ratio. It should also be pointed out here that the gross thrust coefficient technique of correcting the ideal (one-dimensional) gross thrust which is determined using measured aerodynamic variables will not work satisfactorily for an afterburning throttle setting. The reason for this is quite simple and straightforward and is as follows: A non-afterburning throttle setting can produce a gross thrust which is substantially less than the gross thrust generated using an afterburning throttle setting for the same nozzle pressure ratio, flight mach number and altitude. The thermodynamic processes which occur in the tailpipe of an afterburning engine cause a large increase in the gross thrust at the expense of fuel while carrying out the process of combustion with a relatively small decrease in total pressure across the tailpipe. Therefore the $C_{fg}$ technique is not directly applicable to correct the ideal afterburning gross thrust of a jet engine. Furthermore, it is well known that the gross thrust coefficient for turbofan engine is not a unique function of the nozzle pressure ratio but in fact is dependent upon other engine parameters including the engine by-pass ratio which can be altered appreciably by inlet distortion. Inlet distortion can be generated as a result of rocket-armament exhaust gas which is released in the vicinity of the engine inlet ducts and aircraft installation effects.

Accordingly the present invention is based on a discovery that certain internal engine pressures can be used to provide a corrected nozzle inlet static pressure which when introduced into the appropriate gross thrust equation will provide an extremely accurate indication of gross thrust for all throttle settings regardless of flight mach number and altitude. Furthermore it may be used in an afterburning turbofan engine which may be subjected to high levels of inlet distortion. The accuracy will be maintained regardless of the above documented conditions. All that is necessary in order to arrive at the necessary corrected static pressure at the nozzle entry is an engine test in the non-afterburning mode of engine operation with the engine firmly clamped in a sea level test bed.

The following equation has been discovered to yield a corrected nozzle entry static pressure which can be subsequently employed to ascertain accurately jet engine gross thrust:

$$P_{SNC} = (P_{SN}) - (P_{S6}) \cdot \xi \qquad (6)$$

wherein:
$P_{SNC}$ = nozzle entry corrected static pressure
$P_{SN}$ = measured nozzle entry static pressure
$P_{S6}$ = measured flameholder static pressure
and
$\xi$ = a parameter which in its simplest form is a constant; for even greater accuracy, $\xi$ is a function of the ratio of measured flameholder static pressure $P_{S6}$ to diffuser total pressure $P_{T5}$.

The method of determining the constant $\xi$ proceeds by the following steps:

1. The engine under test is placed in sea level test bed facility which can measure the net thrust on the test stand. Sufficient additional instrumentation will be necessary in order to compute the engine gross thrust since the net thrust on the test stand is the result of all the forces which act on the stand and includes inlet momentum, pressure forces acting on the outside of the engine including the intake, and drag on the instrumentation lines.

2. At least one power setting in the non-afterburning mode of engine operation will provide a measured nozzle entry static pressure, flameholder static pressure and diffuser total pressure in addition to the ambient pressure. For better accuracy a number of throttle settings, excluding the afterburning positions, will provide the necessary measurements for determining the factor $\xi$.

3. The measured gross thrust $F_G$, the flameholder static pressure $P_{S6}$, diffuser total pressure $P_{T5}$, ambient static pressure $P_{SO}$, nozzle entrance area $A_N$, tailpipe geometry including $A_6$, [mass addition from the tailpipe liner/casing annulus to the afterburner section (this parameter will be a variable depending upon the engine throttle setting) and the frictional effects introduced by the flameholder are known a priori] are all employed in well known formulae (see for example A. H. Shapiro, *The Dynamics and Thermodynamics of Compressible Fluid Flow*, Ronald Press Company, New York, 1953, Volume I, page 231) in addition to the appropriate gross thrust equation, namely equation (4) or (5). As a direct result of the iterative processes involved, the corrected nozzle entry static pressure $P_{SNC}$ is determined. This process is repeated for each set of measurements which are obtained at the throttle settings selected.

4. The factor $\xi$ is determined from equation (6) written in the following alternate form:
$\xi = P_{SN} - P_{SNC}/P_{S6}$ if only one throttle setting was examined.

If additional throttle settings were used (recalling that only the non-afterburning positions are needed) then the factor $\xi$ can be calculated using the following equation:

$$\xi = \frac{1}{n} \sum_{i=1}^{n} \frac{P_{SNi} - P_{SNCi}}{P_{S6i}}.$$

In this equation $n$ represents the number of power settings which were used.

It will be apparent to someone with ordinary aerodynamic skill that the method of ascertaining the factor $\xi$ is not limited to just a correction for the nozzle entry static pressure. For example, rather than assuming that the measurement $P_{SN}$ is in error, and using the measured gross thrust to compute the corrected value, namely $P_{SNC}$, one could alternately postulate that in fact $P_{SN}$ is correct as measured but $P_{S6}$ may be in error. The same procedure could be adopted to determine a different constant such that another relationship could be used to predict a corrected flameholder static pressure $P_{S6C}$; only measured pressures would be used to calculate the corrected flameholder static pressure in addition to the new constant. It is immediately obvious that a similar argument could be applied to the other pressure which is measured, viz. diffuser total pressure $P_{T5}$. However, it should be sufficient to continue with a description of the preferred method since the above variations would be readily apparent to one skilled in the art.

A different consideration which will be obvious to someone with ordinary skill in the art concerns the introduction of another redundant measurement which is often monitored in the non-afterburning mode of engine operation. The parameter which is often recorded is the nozzle total pressure $P_{TN}$ and it is either measured at the nozzle entry or at the nozzle exit. Since the calibration technique described herein can alternately assume that besides postulating a measurement error in the nozzle entry static pressure, an additional error exists in the measurements of the flameholder static pressure or the diffuser total pressure, then the iterative techniques which were used in step (3) above could be employed to determine say a corrected nozzle inlet static pressure and a corrected flameholder static pressure. Obviously other combinations of corrected pressures are possible.

Although this disclosure uses a specific gross thrust determination technique in order to document the salient features of the invention, the general approach is equally applicable to other gross thrust calculation techniques. Consider a non-afterburning engine for example. The calibration technique could produce a corrected nozzle entry static pressure assuming the nozzle entry total pressure is accurate and another factor could be determined such that the nozzle static pressure, corrected static pressure that is, is available from the following equation:

$$P_{SNC} = P_{SN} - \xi \cdot P_{TN}$$

wherein:
$P_{SNC}$ = corrected nozzle entry static pressure
$P_{SN}$ = measured nozzle entry static pressure
$P_{TN}$ = measured nozzle entry (or exit) total pressure and $\xi$ = a factor determined from test.

For this example, only equation (4) or (5) needs solving using the ambient static pressure $P_{SO}$, nozzle entry total pressure $P_{TN}$, nozzle inlet area $A_N$, and the measured gross thrust $F_G$. The corrected nozzle entry static pressure $P_{SNC}$ is determined. Subsequently the factor $\xi$ can be calculated using the simple equation:

$$\xi = P_{SN} - P_{SNC}/P_{TN}$$

Referring now to FIG. 2, there is shown in block form an example of circuitry suitable for a gross thrustmeter according to the invention disclosed in the application which was referenced herein. Introduced into FIG. 2 is equation (6) which constitutes a novel feature of the present invention. Signals are provided from pressure transducers 11, 12, 13 and 14 and these signals represent, respectively, total pressure $P_{T5}$ from the diffuser, static pressure $P_{S6}$ from the flameholder area, static pressure $P_{SN}$ from the nozzle entry region, and ambient static pressure $P_{SO}$. These signals are applied to a multiplexer 16 which provides as its output a series of signals variable in accordance with the signals applied to it. These signals are applied to an analog to digital converter 17 which converts the signals to digital form. The digital data is applied to an arithmetic unit 18. Associated with arithmetic unit 18 are three memory units. A short term memory 19 or "scratch pad memory," a constants memory 20 and a main program memory 21. The short term memory 19 scales the input data and sources it temporarily for use by the arithmetic unit 18 and as required by the program memory 21. The constants memory 20 receives, in digital form, signals representing constants involved in the computation of the corrected nozzle static pressure $P_{SNC}$ and the nozzle entry total pressure $P_{TN}$. The constants memory 20 also receives a digital signal which is indicative of the type of nozzle employed on the engine, namely convergent or convergent-divergent. The necessary values for calculating the corrected nozzle static pressure and the nozzle total pressure are present in memories 19 and 20. It is believed this is well within the ordinary skill of a workman in the computer arts. The block indicated as 35 in the program memory 21 solves equation (6) for $P_{SNC}$ and this is applied, in addition to the necessary constants $K_1$, $K_2$ and $\gamma$, to circuitry represented by block 22 which provides a signal representing the nozzle total pressure $P_{TN}$. This signal is then applied to circuitry represented by block 23 which generates a signal representing $\alpha_e$, that is, representing $P_{TN}/P_{SO}$.

The decision circuitry 24 receives over 25 a signal (originating in the constants memory 20) that the nozzle is or is not convergent. If the nozzle is convergent-divergent the complete expansion equation (equation 4) is selected as is indicated by block 26. If the nozzle is convergent the signal representing $\alpha_e$ is applied to the decision circuitry represented by block 27. The decision circuitry 27 determines whether there is complete or incomplete expansion by solving $$\alpha_e < (\gamma + 1/2) \cdot \gamma/\gamma - 1$$

where $\gamma$ is the exhaust gas ratio of specific heats.

If the decision circuitry 27 solves the equation above as "yes" then the expansion is considered complete and the circuitry selects block 26 which represents the complete expansion equation (4). If the decision circuitry 27 solves the equation as "no" then the expansion is considered as incomplete and the circuitry selects block 28 which represents the incomplete expansion equation (5).

The appropriate equation is available via an interface 30 and is solved by arithmetic unit 18 for gross thrust. The signal representing gross thrust is applied over conductor 31 to an indicator interface 33 which also receives a control signal on conductor 32. The indicator drive signal is applied to indicating instrument 5 over conductor 34.

It is believed that the computer circuitry for solving the equations set forth is within the ordinary skill of a computer technician and that no further description is required.

The embodiments of the invention in which an exclusive property or privilege is claimed are defined as follows:

1. A method for determining a functional relationship for correcting a variable used as an input for a gross thrustmeter, comprising
    running a jet engine;
    measuring the values $A_N$, $P_{SO}$, $F_G$, $P_{SN}$ and $P_{TN}$, where $A_N$ is nozzle entry area, a constant,
    $P_{SO}$ is ambient static pressure,
    $F_G$ is gross thrust,
    $P_{SN}$ is nozzle entry static pressure and
    $P_{TN}$ is nozzle total pressure;
    using the measured values of $A_N$, $P_{SO}$, $F_G$ and one of $P_{SN}$ and $P_{TN}$ in the following equation:

$$F_G = A_N \cdot P_{SO} \cdot P_{TN}/P_{SO} \cdot f(P_{TN}/P_{SO}) \cdot h(P_{TN}/P_{SN})$$

to determine a value for one of $P'_{SN}$ and $P'_{TN}$ respectively, where
    $P'_{SN}$ is a corrected nozzle entry static pressure,
    $P'_{TN}$ is a corrected nozzle total pressure and where
    $fF(P_{TN}/P_{SO})$ is a function of the nozzle pressure ratio $P_{TN}/P_{SO}$ and
    $h(P_{TN}/P_{SN})$ is a function of the pressure ratio $P_{TN}/P_{SN}$;
    obtaining the respective functional relationships $g_1(P_{SN}, P_{TN})$ for correcting $P_{SN}$ and $g_2(P_{SN}, P_{TN})$ for correcting $P_{TN}$ according to one of the equations
    $P'_{SN} = g_1(P_{SN}, P_{TN})$ and
    $P'_{TN} = g_2(P_{SN}, P_{TN})$.

2. A method for determining a functional relationship for correcting a variable used as an input for a gross thrustmeter comprising
    running a jet engine,
    determining the condition of operation of the engine as being in one of two conditions where (1) the expansion of the exhaust gas is complete, and (2) where the expansion of the exhaust gas is incomplete
    measuring the values $A_N$, $P_{SO}$, $F_G$, $P_{SN}$ and $P_{TN}$, where $A_N$ is nozzle entry area, a constant
    $P_{SO}$ is ambient static pressure $F_G$ is gross thrust
$P_{SN}$ is nozzle entry static pressure
$P_{TN}$ is nozzle total pressure
using these measured values in the following equation $$F_G = A_N \cdot P_{SO} \cdot P_{TN}/P_{SO} \cdot f(P_{TN}/P_{SO}) \cdot h(P_{TN}/P_{SN})$$

with the exception of one of $P_{SN}$ and $P_{TN}$ to determine a value for one of $P'_{SN}$ and $P'_{TN}$ respectively where $f(P_{TN}/P_{SO}) = f_c(P_{TN}/P_{SO})$ is a function of the nozzle pressure ratio and $h(P_{TN}/P_{SN})$ is a function of $P_{TN}/P_{SN}$ for complete expansion when condition (1) exists and where $f(P_{TN}/P_{SO}) = f_i(P_{TN}/P_{SO})$ is a function of the nozzle pressure ratio and $h(P_{TN}/P_{SN})$ is a function of $P_{TN}/P_{SN}$ for incomplete expansion when condition (2) exists to obtain the respective functional relationship $g_1(P_{SN}, P_{TN})$ for correcting $P_{SN}$ and $g_2(P_{SN}, P_{TN})$ for correcting $P_{TN}$ according to one of the equations
$P'_{SN} = g_1(P_{SN}, P_{TN})$ and
$P'_{TN} = g_2(P_{SN}, P_{TN})$.

3. A method as defined in claim 2 in which the step of running said jet engine is on a sea level static test bed.

4. A method as defined in claim 2 in which the step of running said engine is carried out with the engine in a non-afterburning mode.

5. A method for determining a functional relationship for correcting a variable used as an input for a gross thrustmeter, comprising
running a jet engine;
measuring the values $A_N$, $P_{SO}$, $F_G$, $P_{SN}$, and at least one of $P_{S6}$ and $P_{T5}$ and calculating $P_{TN}$ using $P_{SN}$ and said at least one of the independent measured pressures $P_{S6}$ and $P_{T5}$ where
$A_N$ is nozzle entry area, a constant,
$P_{SO}$ is ambient static pressure,
$F_G$ is gross thrust,
$P_{SN}$ is nozzle entry static pressure,
$P_{TN}$ is nozzle total pressure,
$P_{S6}$ is the static pressure at the flameholder region, and
$P_{T5}$ is the total pressure in the diffuser;
using the measured and calculated values in the following equation $$F_G = A_N \cdot P_{SO} \cdot P_{TN}/P_{SO} \cdot f(P_{TN}/P_{SO}) \cdot h(P_{TN}/P_{SN})$$

with the exception of one of the values $P_{SN}$ and $P_{TN}$ to determine a value for one of $P'_{SN}$ and $P'_{TN}$ respectively, where
$P'_{SN}$ is a corrected nozzle entry static pressure
$P'_{TN}$ is a corrected nozzle total pressure and where
$f(P_{TN}/P_{SO})$ is a function of the nozzle pressure ratio $P_{TN}/P_{SO}$
$h(P_{TN}/P_{SN})$ is a function of the pressure ratio $P_{TN}/P_{SN}$
to obtain the respective functional relationship $g_1(P_{SN}, P_{TN})$ for correcting $P_{SN}$ or $g_2(P_{SN}, P_{TN})$ for correcting $P_{TN}$ according to one of the equations
$P'_{SN} = g_1(P_{SN}, P_{TN})$ and
$P'_{TN} = g_2(P_{SN}, P_{TN})$.

6. A method as defined in claim 5 in which the calculation of $P_{TN}$ is according to the following relationship wherein
$P_{TN}$ is the total pressure in the nozzle entrance region,
$P_{T5}$ is the total pressure in the diffuser,
$P_{SN}$ is the static pressure at the nozzle entrance,
$P_{S6}$ is the static pressure at a position within said engine between the upstream side of the diffuser and the nozzle entrance,
$K_1$ is a dimensionless constant
$K_2$ is a dimensionless constant derived from tailpipe geometry
$K_3$ is a dimensionless constant derived from the known thermodynamic properties of the engine exhaust gas
$\alpha_5 = P_{T5}/P_{S6}$
$f_6(\alpha_5)$ and $f_7(\alpha_5)$ are functions of the pressure ratio $P_{T5}/P_{S6}$
$f_1(P_{S6}, P_{SN})$, $f_2(P_{S6}, P_{SN})$ and $f_5(P_{S6}, P_{SN})$ are functions of the static pressures $P_{S6}$ and $P_{SN}$, and
$f_3(K_2)$ and $f_4(K_2)$ are functions of the constant $K_2$.

7. A method as defined in claim 5 in which said engine is in the non-afterburning mode and in which the calculation of $P_{TN}$ is according to the following relationship $$P_{TN} = P_{T5} (1 - a_2 P_{SN}/P_{T5} - b_2)$$

where
$P_{TN}$ is the total pressure at the nozzle entrance,
$P_{T5}$ is the total pressure in the diffuser,
$P_{Sn}$ is the static pressure at the nozzle entrance,
$a_2$ is a constant representing the slope of the straight line relationship $P''_{T5} - P''_{TN}/P''_{T5}$ against $P''_{SN}/P''_{T5}$ determined by test with said engine operating without an afterburner in operation, and
$b_2$ is a constant representing the intercept of said straight line relationship determined by test without an afterburner in operation on the axis represented by $P''_{T5} - P''_{TN}/P''_{T5}$.

8. A method as defined in claim 5 in which said engine is operating in an afterburning mode and $P_{TN}$ is calculated according to the following relationship $$P_{TN} = P_{T5} (1 - a_1 P_{SN}/P_{T5} - b_1)$$

where
$P_{TN}$ is the total pressure at the nozzle entrance,
$P_{T5}$ is the total pressure in the diffuser,
$P_{SN}$ is the static pressure at the nozzle entrance,
$a_1$ is a constant representing the slope of the straight line relationship $P''_{T5} - P''_{TN}/P''_{T5}$ against $P''_{SN}/P''_{T5}$ determined by test with said engine operating with said afterburner in operation, and
$b_1$ is a constant representing the intercept of said straight line relationship, determined by test with said afterburner in operation, on the axis represented by $P''_{T5} - P''_{TN}/P''_{T5}$.

9. A method for determining a functional relationship for correcting a variable used as an input for a gross thrustmeter, comprising
running a jet engine
measuring the values $A_N$, $P_{SO}$, $F_G$, $P_{SN}$, $P_{S6}$ and $P_{T5}$ where
$A_N$ is nozzle entry area, a constant
$P_{SO}$ is ambient static pressure
$F_G$ is gross thrust $$P_{TN} = P_{SN} \cdot \left\{ 1 + \frac{\frac{f_1(P_{S6}, P_{SN})}{f_2(P_{S6}, P_{SN})} + f_6(\alpha_5) \cdot \left[f_3(K_2) + \frac{f_5(P_{S6}, P_{SN})}{f_2(P_{S6}, P_{SN})}\right] \cdot [f_7(\alpha_5) - K_1]}{f_4(K_2) - \frac{f_5(P_{S6}, P_{SN})}{f_2(P_{S6}, P_{SN})}} \right\} K_3$$

$P_{SN}$ is nozzle entry static pressure
$P_{S6}$ is the static pressure at the flameholder region
$P_{T5}$ is the total pressure in the diffuser
using the measured values in the following interconnected equations with the exception of $P_{SN}$ to determine $P'_{SN}$, where
$P'_{SN}$ is a corrected nozzle entry static pressure $$P_{TN} = P_{SN} \cdot \left\{ 1 + \frac{\frac{f_1(P_{S6}, P_{SN})}{f_2(P_{S6}, P_{SN})} + f_6(\alpha_5) \cdot \left[ f_3(K_2) + \frac{f_5(P_{S6}, P_{SN})}{f_2(P_{S6}, P_{SN})} \right] \cdot [f_7(\alpha_5) - K_1]}{f_4(K_2) - \frac{f_5(P_{S6}, P_{SN})}{f_2(P_{S6}, P_{SN})}} \right\} K_3$$

where
$P_{TN}$ is to total pressure at the nozzle entrance,
$K_1$ is a dimensionless constant
$K_2$ is a dimensionless constant derived from tailpipe geometry
$K_3$ is a dimensionless constant derived from the known thermodynamic properties of the engine exhaust gas
$\alpha_5 = P_{T5}/P_{S6}$
$f_6(\alpha_5)$ and $f_7(\alpha_5)$ are functions of the pressure ratio $P_{T5}/P_{S6}$
$f_1(P_{S6}, P_{SN})$, $f_2(P_{S6}, P_{SN})$ and $f_5(P_{S6}, P_{SN})$ are functions of the static pressures $P_{S6}$ and $P_{SN}$, and
$f_3(K_2)$ and $f_4(K_2)$ are functions of the constant $K_2$ $$F_G = A_N \cdot P_{SO} \cdot P_{TN}/P_{SO} \cdot f(P_{TN}/P_{SO}) \cdot h(P_{TN}/P_{SN})$$

to obtain a functional relationship $g_1(P_{S6}, P_{SN})$ for correcting $P_{SN}$ according to the equation $P'_{SN} = g_1(P_{S6}, P_{SN})$.

10. Apparatus for use in combination with a jet type engine of a type including a diffuser and a nozzle, for determining a corrected static or total pressure at the entrance to the nozzle, comprising
pressure responsive means for measuring engine pressures including nozzle entrance static pressure $P_{SN}$ and nozzle entrance total pressure $P_{TN}$ and providing first and second signals representing $P_{SN}$ and $P_{TN}$ respectively.
computer means for combining at least said first and second signals to develop a corrected pressure for one of the group of pressures comprising $P_{SN}$ and $P_{TN}$ and for providing a third signal representing said corrected pressure; and
circuit means for connecting said pressure responsive means to said computer means for delivering said signals thereto.

11. Apparatus as defined in claim 10 and further including
means to provide a fourth signal representing measured gross thrust $F_G$,
means to provide a fifth signal representing nozzle entry area $A_N$,
means to provide a sixth signal representing ambient static pressure $P_{SO}$,
and in which said computer means combines one of said first and second signals, and said fourth, fifth and sixth signals in the following manner $$F_G = A_N \cdot P_{SO} \cdot P_{TN}/P_{SO} \cdot f(P_{TN}/P_{SO}) \cdot h(P_{TN}/P_{SN})$$

where
$f(P_{TN}/P_{SO})$ is a function of the nozzle pressure ratio $P_{TN}/P_{SO}$
$h(P_{TN}/P_{SN})$ is a function of the pressure ratio $P_{TN}/P_{SN}$,
to determine a corrected value for the other of said first and second signals, said corrected value being represented by said third signal.

12. Apparatus for use in a jet type engine including a diffuser and a nozzle, for determining a corrected nozzle entrance static pressure $P_{SN}$, comprising
pressure responsive means for measuring engine pressures including $P_{SN}$, static pressure in the flameholder region $P_{S6}$ and total pressure in the diffuser $P_{T5}$, and providing a first, second and third signal representing $P_{SN}$, $P_{S6}$ and $P_{T5}$ respectively, and
computer means for combining at least said first, second and third signals to develop a corrected pressure $P'_{SN}$ and providing a fourth signal representing $P'_{SN}$.

* * * * *

UNITED STATES PATENT OFFICE
CERTIFICATE OF CORRECTION

Patent No. 3,837,220          Dated September 24, 1974

Inventor(s) George B. McDonald et al

It is certified that error appears in the above-identified patent and that said Letters Patent are hereby corrected as shown below:

Column 2, line 40:

Change "$E_{SN}$ = gross thrust" to --$F_g$ = gross thrust--.

Column 3:

In the equation between lines 47 and 57, read "$K_3$" as an exponent rather than as a multiplying factor.

Column 4, line 57:

Change "$P_{T5} - P_{TN}/P_{T5}$" to --$(P_{T5} - P_{TN})/P_{T5}$--.

line 60:

Change "$P_{T5} - P_{TN}/P_{T5}$" to --$(P_{T5} - P_{TN})/P_{T5}$--.

Column 5, line 65:

Change "$P_6$" to --$P_{S6}$--.

Column 8, line 10:

Change "$\xi = P_{SN} - P_{SNC}/P_{S6}$" to --$\xi = (P_{SN} - P_{SNC})/P_{S6}$--.

Claim 1, Column 10, line 47:

Change "$fF(P_{TN}/P_{SO})$" to --$f(P_{TN}/P_{SO})$--.

UNITED STATES PATENT OFFICE
CERTIFICATE OF CORRECTION

Patent No. 3,837,220           Dated September 24, 1974

Inventor(s) George B. McDonald et al

It is certified that error appears in the above-identified patent and that said Letters Patent are hereby corrected as shown below:

Page 2

Claim 6, column 11, last line:

In the equation, read "$K_3$" as an exponent rather than as a multiplying factor.

Claim 9, column 13, between lines 7 and 17:

In the equation, read "$K_3$" as an exponent rather than as a multiplying factor.

Signed and sealed this 13th day of May 1975.

(SEAL)
Attest:

RUTH C. MASON
Attesting Officer

C. MARSHALL DANN
Commissioner of Patents
and Trademarks